United States Patent
Tanaka et al.

(10) Patent No.: US 7,570,315 B2
(45) Date of Patent: Aug. 4, 2009

(54) DISPLAY APPARATUS

(75) Inventors: Shinya Tanaka, Kobe (JP); Yuta Moriya, Kobe (JP); Takayuki Yukawa, Kobe (JP)

(73) Assignee: Fujitsu Ten Limited, Hyogo-ku (JP)

( * ) Notice: Subject to any disclaimer, the term of this patent is extended or adjusted under 35 U.S.C. 154(b) by 219 days.

(21) Appl. No.: 11/520,743

(22) Filed: Sep. 14, 2006

(65) Prior Publication Data
US 2007/0064170 A1    Mar. 22, 2007

(30) Foreign Application Priority Data
Sep. 21, 2005   (JP)   ............... 2005-274791

(51) Int. Cl.
*G02F 1/1333* (2006.01)
(52) U.S. Cl. ............... 349/58; 349/60; 349/161; 315/32; 353/52; 359/15; 359/24
(58) Field of Classification Search .............. 349/58
See application file for complete search history.

(56) References Cited

U.S. PATENT DOCUMENTS

| | | | |
|---|---|---|---|
| 5,381,684 A | 1/1995 | Kawamura | |
| 5,450,292 A | 9/1995 | Yokoyama et al. | |
| 5,453,855 A | 9/1995 | Nakamura et al. | |
| 5,581,683 A | 12/1996 | Bertignoll et al. | |
| 5,828,415 A | 10/1998 | Keating et al. | |
| 5,936,596 A | 8/1999 | Yoshida et al. | |
| 6,046,849 A | 4/2000 | Moseley et al. | |
| 6,055,013 A | 4/2000 | Woodgate et al. | |
| 6,055,103 A | 4/2000 | Woodgate et al. | |
| 6,104,451 A * | 8/2000 | Matsuoka et al. ............... | 349/58 |
| 6,108,060 A | 8/2000 | Funamoto et al. | |
| 6,377,295 B1 | 4/2002 | Woodgate et al. | |
| 6,437,915 B2 | 8/2002 | Moseley et al. | |
| 6,512,607 B1 * | 1/2003 | Windsor et al. ............... | 359/15 |
| 6,545,655 B1 | 4/2003 | Fujikawa | |
| 6,624,863 B1 | 9/2003 | Jacobs et al. | |
| 6,628,352 B1 | 9/2003 | Sumida et al. | |
| 6,731,416 B2 * | 5/2004 | Hazzard ................ | 359/24 |
| 6,954,185 B2 | 10/2005 | Ogino | |
| 6,960,001 B2 | 11/2005 | Nitto et al. | |

(Continued)

FOREIGN PATENT DOCUMENTS

EP    0 829 744 A2    3/1998

(Continued)

OTHER PUBLICATIONS

S. Tanaka et al., "Display Apparatus," U.S. Appl. No. 11/520,748, filed Sep. 14, 2006.

(Continued)

*Primary Examiner*—Frank G Font
*Assistant Examiner*—Mary A El Shammaa
(74) *Attorney, Agent, or Firm*—Oliff & Berridge, PLC

(57) ABSTRACT

A display apparatus includes a display that displays individual images in a plurality of viewing directions on a common screen, a main body having a different chassis from that of the display, a display fan that cools down inside of the display, and a main body fan that cools down the inside of the main body.

9 Claims, 17 Drawing Sheets

U.S. PATENT DOCUMENTS

| | | |
|---|---|---|
| 7,030,944 B2 | 4/2006 | Fujimoto |
| 7,077,526 B2 * | 7/2006 | Overmann et al. ............ 353/52 |
| 7,151,532 B2 | 12/2006 | Schulz |
| 7,167,222 B2 | 1/2007 | Inoue et al. |
| 7,250,710 B2 * | 7/2007 | Gilmour et al. ............ 313/112 |
| 7,292,296 B2 | 11/2007 | Kanbe et al. |
| 7,337,450 B2 | 2/2008 | Sato et al. |
| 7,354,163 B2 | 4/2008 | Suzuki et al. |
| 2001/0043302 A1 | 11/2001 | Inoue et al. |
| 2002/0001128 A1 | 1/2002 | Moseley et al. |
| 2003/0085659 A1 * | 5/2003 | Overmann et al. ............ 315/32 |
| 2003/0142249 A1 | 7/2003 | Fujimoto |
| 2004/0119896 A1 | 6/2004 | Kean et al. |
| 2004/0263060 A1 * | 12/2004 | Gilmour et al. ............ 313/501 |
| 2004/0263717 A1 | 12/2004 | Hsu et al. |
| 2005/0052529 A1 | 3/2005 | Mashitani et al. |
| 2005/0111100 A1 | 5/2005 | Mather et al. |
| 2005/0174658 A1 | 8/2005 | Long et al. |
| 2006/0066507 A1 | 3/2006 | Yanagisawa |
| 2006/0191177 A1 | 8/2006 | Engel |
| 2006/0192746 A1 | 8/2006 | Ioki et al. |

FOREIGN PATENT DOCUMENTS

| | | |
|---|---|---|
| GB | 2 405 545 A | 3/2005 |
| GB | 2 405 546 A | 3/2005 |
| JP | A-05-055623 | 5/1993 |
| JP | A-05-246285 | 9/1993 |
| JP | A-6-186526 | 7/1994 |
| JP | A-6-236152 | 8/1994 |
| JP | A-7-103778 | 4/1995 |
| JP | A-9-46622 | 2/1997 |
| JP | A 10-123461 | 5/1998 |
| JP | A-10-130537 | 5/1998 |
| JP | A-11-52105 | 2/1999 |
| JP | A-11-52372 | 2/1999 |
| JP | A 11-84131 | 3/1999 |
| JP | A-11-088245 | 3/1999 |
| JP | A-11-95167 | 4/1999 |
| JP | A-11-109339 | 4/1999 |
| JP | A-11-248466 | 9/1999 |
| JP | A-11-331876 | 11/1999 |
| JP | A-11-339527 | 12/1999 |
| JP | A-2000-36927 | 2/2000 |
| JP | A-2000-47195 | 2/2000 |
| JP | A-2000-076838 | 3/2000 |
| JP | A-2000-137443 | 5/2000 |
| JP | A-2000-162979 | 6/2000 |
| JP | A-2000-180834 | 6/2000 |
| JP | A-2000-261731 | 9/2000 |
| JP | A-2001-083903 | 3/2001 |
| JP | A-2001-283926 | 10/2001 |
| JP | A-2001-311944 | 11/2001 |
| JP | A-2002-234399 | 8/2002 |
| JP | A-2003-121847 | 4/2003 |
| JP | A-2003-137005 | 5/2003 |
| JP | A-2003-196682 | 7/2003 |
| JP | A-2003-197018 | 7/2003 |
| JP | A-2003-337326 | 11/2003 |
| JP | A-2004-79488 | 3/2004 |
| JP | B2-3503925 | 3/2004 |
| JP | A-2004-233816 | 8/2004 |
| JP | A-2004-348204 | 12/2004 |
| JP | A-2005-71286 | 3/2005 |
| JP | A-2005-73076 | 3/2005 |
| JP | A 2005-78080 | 3/2005 |
| JP | A-2005-86773 | 3/2005 |
| JP | A-2005-255090 | 9/2005 |
| JP | A-2005-284592 | 10/2005 |
| JP | A-2005-313782 | 11/2005 |
| JP | A-2006-64733 | 3/2006 |
| JP | A-2006-076369 | 3/2006 |
| JP | A-2006-131227 | 5/2006 |
| JP | A-2006-151363 | 6/2006 |
| JP | A-2006-151364 | 6/2006 |
| KR | 2000-0008458 | 2/2000 |
| KR | 10-2005-0008173 | 1/2005 |
| WO | WO 97/42540 | 11/1997 |
| WO | WO 2004/011987 A1 | 2/2004 |
| WO | WO 2004/016460 A1 | 2/2004 |

OTHER PUBLICATIONS

S. Tanaka et al., "Display Apparatus and In-Vehicle Display Apparatus," U.S. Appl. No. 11/712,517, filed Mar. 1, 2007.
S. Tanaka, "Display Apparatus," U.S. Appl. No. 11/520,670, filed Sep. 14, 2006.
S. Tanaka et al., "In-Vehicle Display Apparatus and Display Control Method Therefor," U.S. Appl. No. 11/583,076, filed Oct. 19, 2006.
S. Tanaka, "Liquid Crystal Display Apparatus," U.S. Appl. No. 11/488,064, filed Jul. 18, 2006.
S. Tanaka, "Display Device and Display Method," U.S. Appl. No. 11/299,657, filed Dec. 13, 2005.
M. Maehata et al., "Receiver," U.S. Appl. No. 11/475,216, filed Jun. 27, 2006.
"Fujitsu Ten Technical Report", vol. 23, No. 2, Dec. 2005, pp. 22-27.
"Fujitsu Ten Technical Journal," No. 26, Jan. 2006, pp. 17-22.

* cited by examiner

FIG. 1
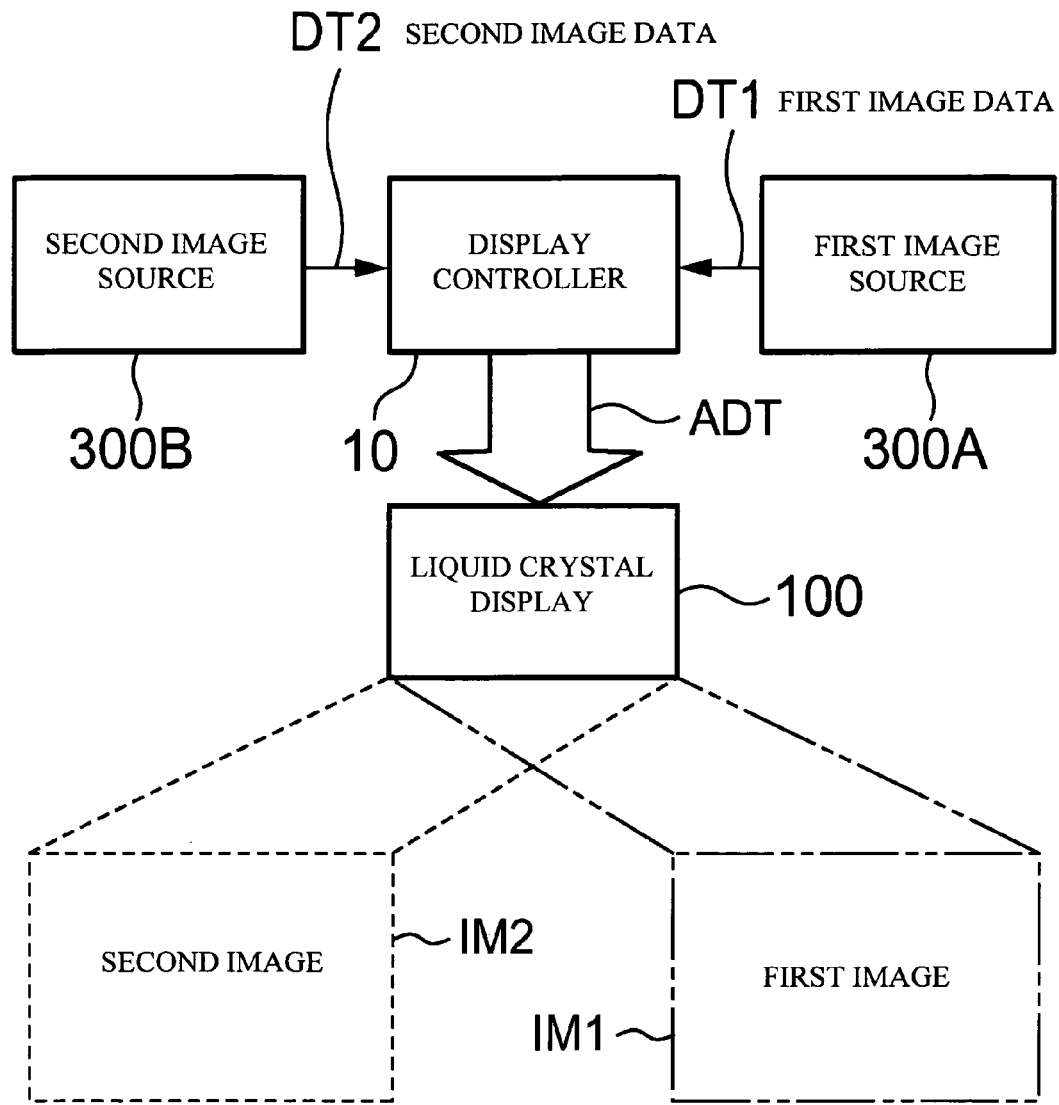
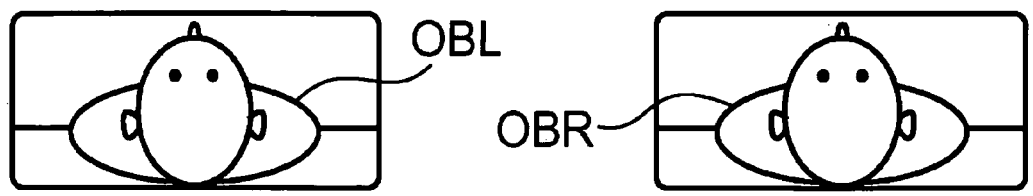

DISPLAY APPARATUS

BACKGROUND OF THE INVENTION

1. Field of the Invention

This invention generally relates to display apparatuses, and more particularly, to a display apparatus having a display and a main body.

2. Description of the Related Art

In recent years, in-vehicle display apparatuses have become widespread, enabling passengers to watch car navigation maps or video images. In-vehicle display apparatuses are, in most cases, located in a dashboard part, between the driver and the front-seat passenger. The in-vehicle apparatus must have a certain size, as viewed from the front surface. However, the display screen must be large. Hence, the display apparatus includes a display and a main body. The display is housed in the front surface of the main body when used, such that the size of the display screen in the display apparatus is almost the same as that as viewed from the front surface of the display apparatus. Meanwhile, the operation of the memory medium, such as DVD or the like, and the operation of other switches, are performed on the front surface by moving the display.

An exemplary known so-called multi-view display having a common display screen, on which different images are respectively visible from different viewing directions (view angles), includes a multi-view display with a liquid crystal panel having a parallax barrier on the front side thereof. Different information (images) can be displayed on the right and left sides of the display screen by separating directions of lights through a backlight on a pixel basis (for example, as disclosed in Japanese Patent Application Publication No. 2005-78080). Such a display is mounted on a vehicle, allowing the front-seat passenger to watch a TV program or another image, while the driver is checking a navigation map image.

As the power consumption in the display is increased, the temperature inside the display is also increased. For example, if the multi-view display is employed as an in-vehicle display apparatus, lights from the backlight are separated into left and right images. Therefore, in order to maintain the brightness of the left and right images, the brightness of the backlight has to be increased. However, such increased brightness of the backlight increases the power consumption of the light source, which is, for example, a fluorescent tube or a light-emitting part of a white LED or the like. Accordingly, a considerable amount of heat is developed inside the display, and the temperature rises inside the display.

SUMMARY OF THE INVENTION

The present invention has been made in view of the above circumstances and provides a display apparatus in which the inside of a display can be cooled down effectively.

According to one aspect of the present invention, preferably, there is provided a display apparatus including: a display that displays individual images in a plurality of viewing directions on a common screen; a main body having a different chassis from that of the display; a display fan that cools down inside of the display; and a main body fan that cools down the inside of the main body. The display fan is capable of cooling down the inside of the display efficiently.

BRIEF DESCRIPTION OF THE DRAWINGS

Preferred exemplary embodiments of the present invention will be described in detail with reference to the following drawings, wherein:

FIG. 1 is a view illustrating a basic configuration of a multi-view display apparatus in accordance with a first embodiment of the present invention;

DESCRIPTION OF THE PREFERRED EMBODIMENTS

A description will now be given, with reference to the accompanying drawings, of exemplary embodiments of the present invention.

First Exemplary Embodiment

FIG. 1 is a view illustrating a basic configuration of a multi-view display apparatus in accordance with a first exemplary embodiment of the present invention. In the first exemplary embodiment, a description will be given of an example in which the display apparatus is mounted in a vehicle. Referring now to FIG. 1, the multi-view display apparatus includes a display controller 10 that serves as a display control portion and a display 100 that serves as a display portion. To the display controller 10, image data DT1 is supplied from a first image source 300A that servers as a supply source, and at the same time, image data DT2 is also supplied from a second image source 300B that servers as a supply source. Then, image data ADT, which is composed of the first image data DT1 and the second image data DT2, is output to the common display 100. The configuration of the display controller 10 will be described later in detail. The first image source 300A and the second image source 300B are respectively composed of a camera, TV receiver, DVD reproducing portion, HD reproducing portion, navigation portion, and the like, as will be described later.

The display 100 includes a liquid crystal panel, backlight, parallax barrier, and the like, as will also be described later. A first image IM1 based on the first image data DT1 and a second image IM2 based on the second image data DT2 are displayed on a common display screen so that an observer OBR can watch the first image IM1 from a right-hand direction and an observer OBL can watch the second image IM2 from a left-hand direction. The configuration of the display 100 will also be described later in detail.

Figure 2:
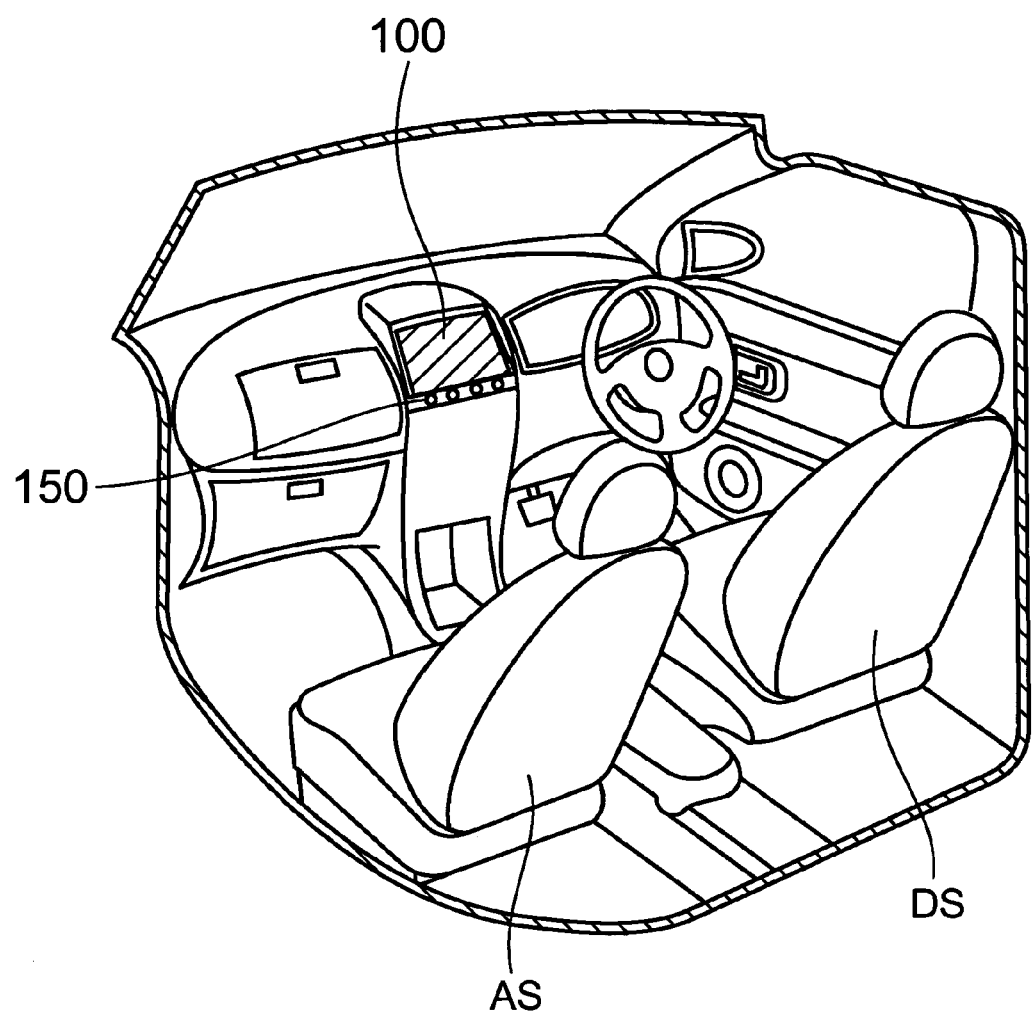
FIG. 2 is a perspective view showing an example in which the display apparatus is applied to a vehicle in accordance with the first embodiment of the present invention.

FIG. 2 is a perspective view showing an example in which the display apparatus employed in the first exemplary embodiment of the present invention is applied to a vehicle. Referring to FIG. 2, the display 100 is arranged between a driver's seat DS and a front passenger's seat AS in a dashboard area of the vehicle. In addition, the display 100 is provided with an operating portion 150 so as to manually operate the display apparatus. According to an exemplary embodiment shown in FIG. 2, a passenger who sits on the driver's seat DS corresponds to the above-described observer OBR, and another passenger who sits on the front passenger's seat AS corresponds to the above-described observer OBL. Those passengers are able to simultaneously watch the first image IM1 and the second image IM2, which are respectively different, being displayed on the display 100 from the driver's seat DS and from the front passenger's seat AS.

Figure 3:
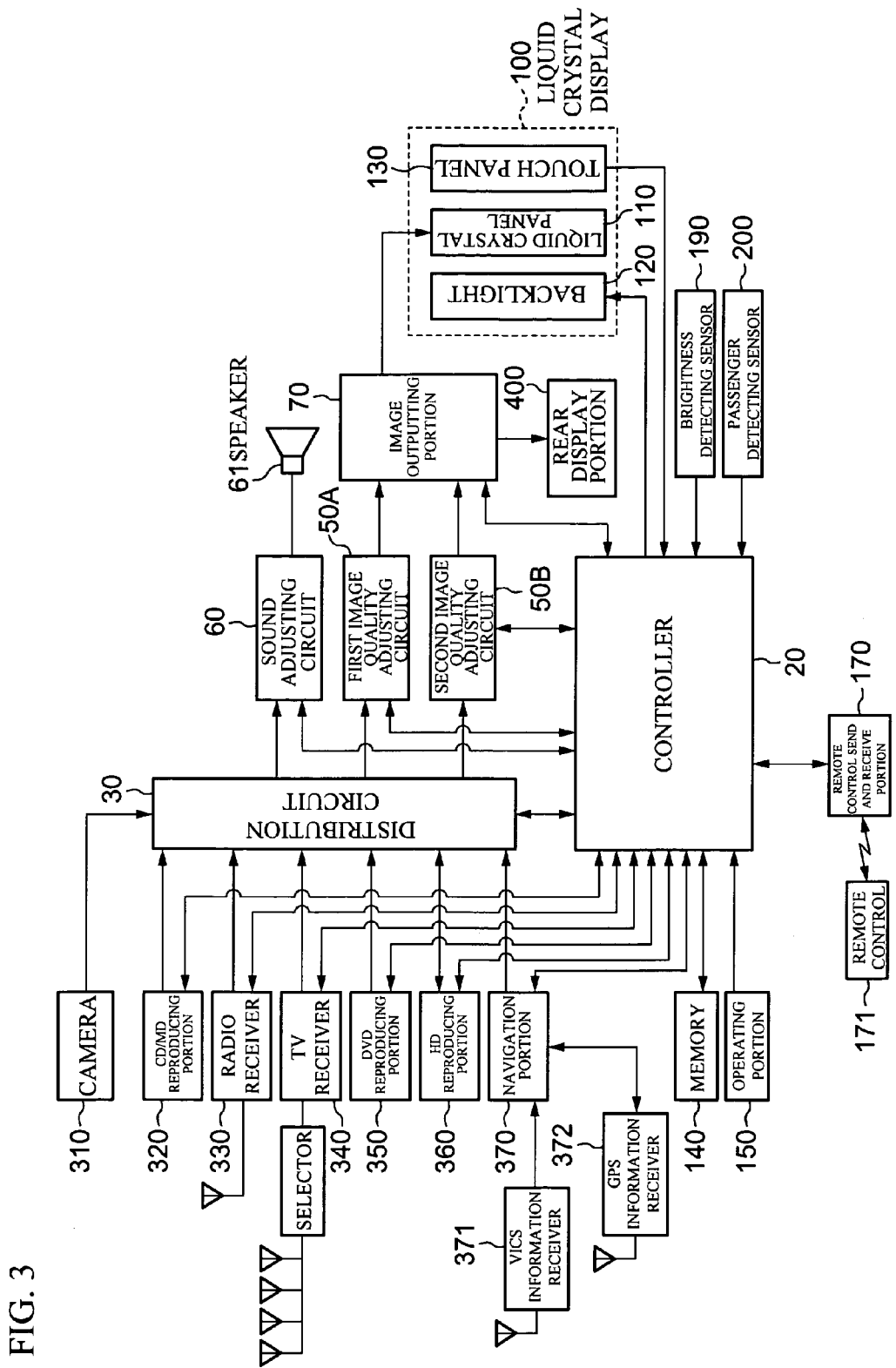
FIG. 3 is a functional block diagram of the display apparatus in accordance with the first embodiment of the present invention.
Figure 4:
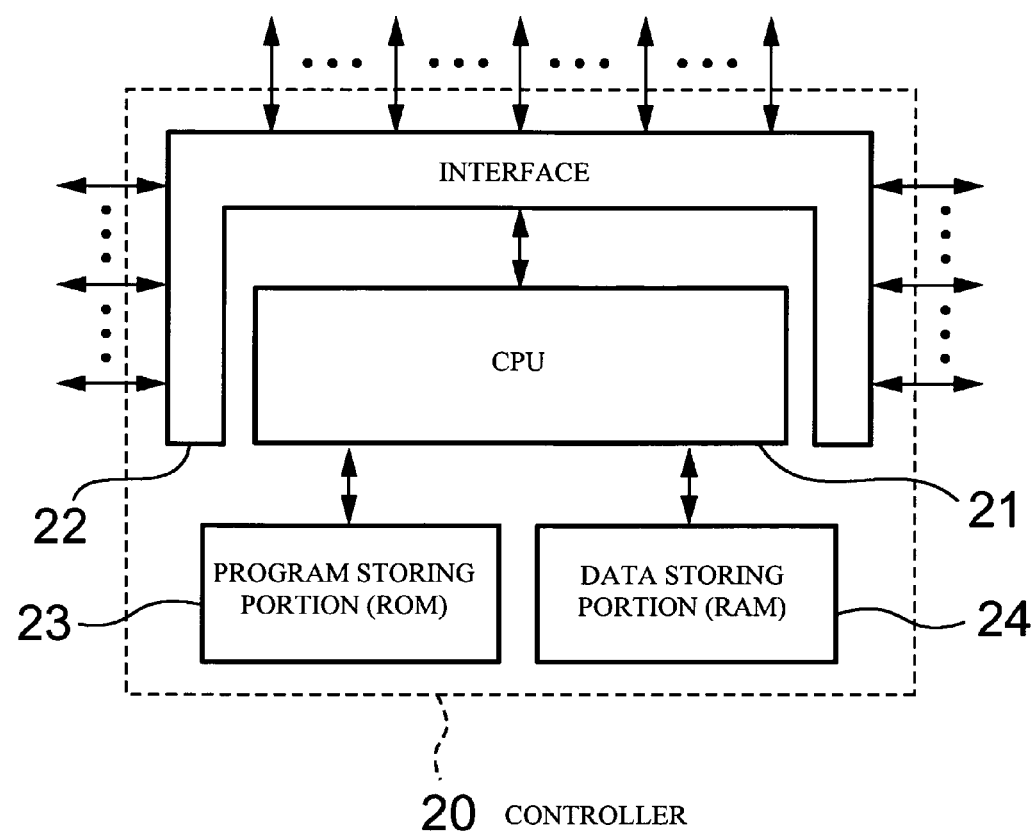
FIG. 4 is a functional block diagram showing a configuration of a controller in accordance with the first embodiment of the present invention.
Figure 5:
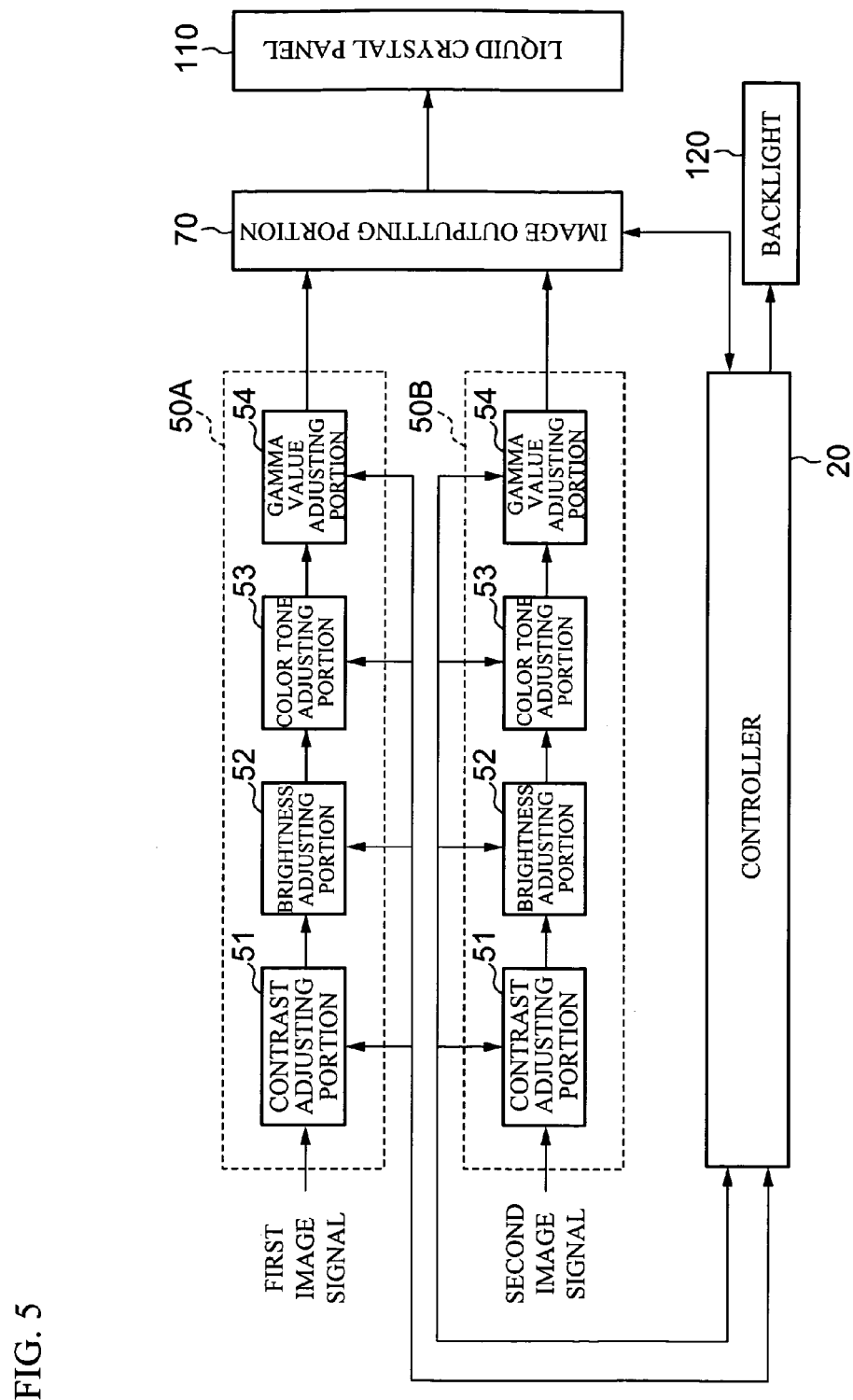
FIG. 5 is a functional block diagram of first and second image quality adjusting circuits in accordance with the first embodiment of the present invention.
Figure 6:
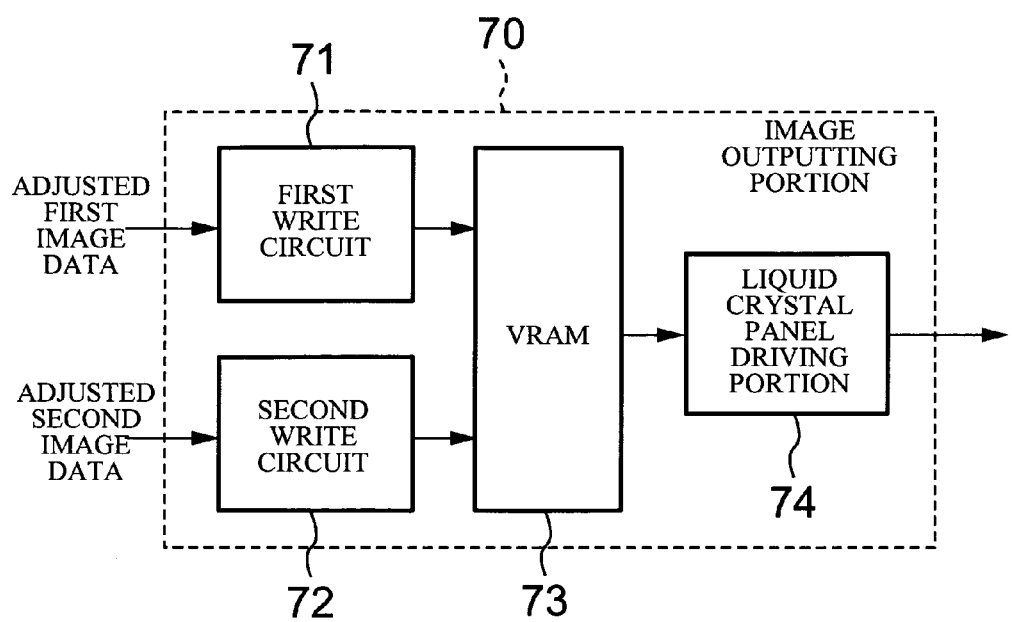
FIG. 6 is a functional block diagram of an image outputting portion in accordance with the first embodiment of the present invention.
Figure 7:
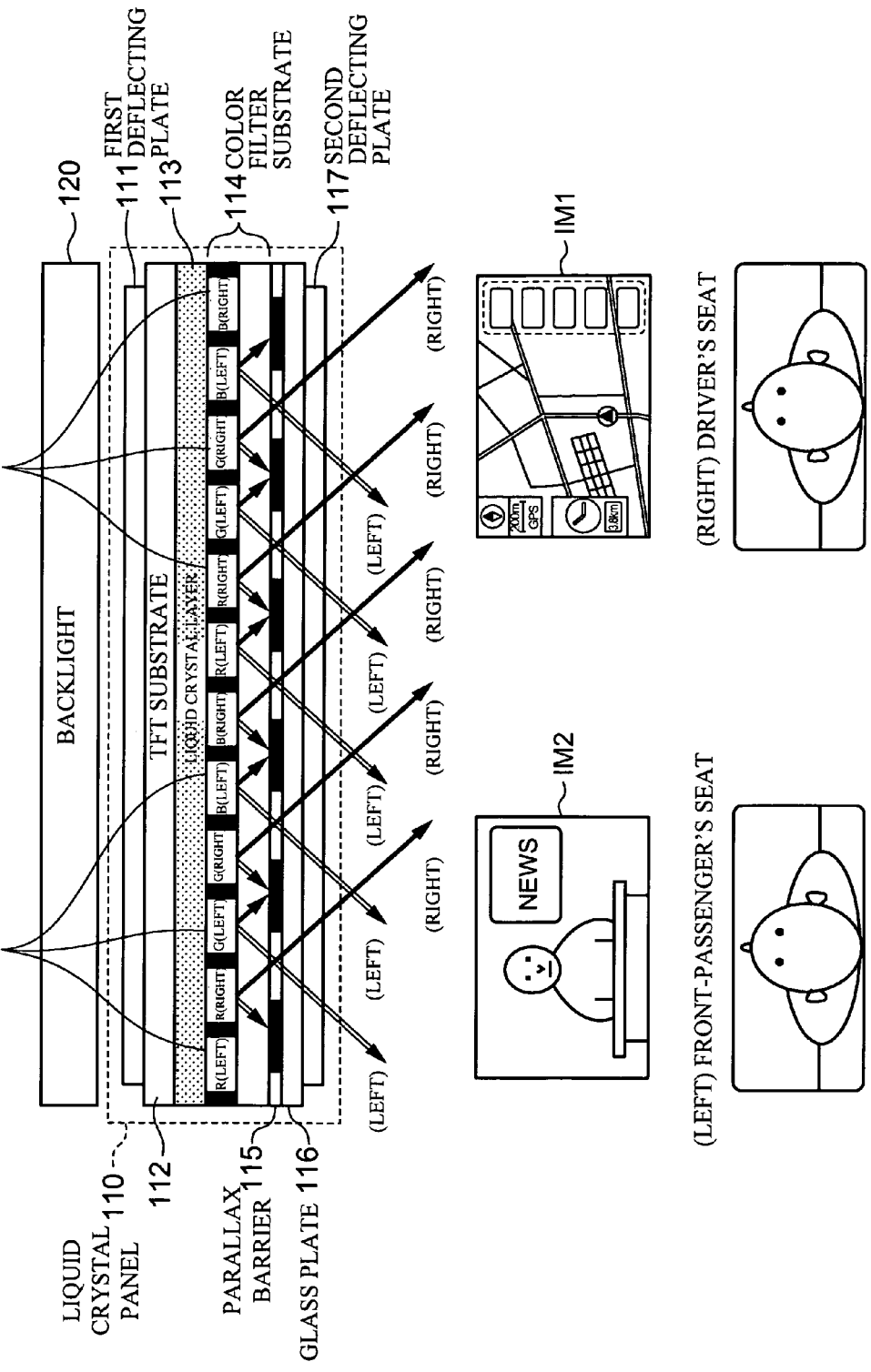
FIG. 7 is a view illustrating a cross-sectional configuration and effects of a liquid crystal panel in accordance with the first embodiment of the present invention.
Figure 8:
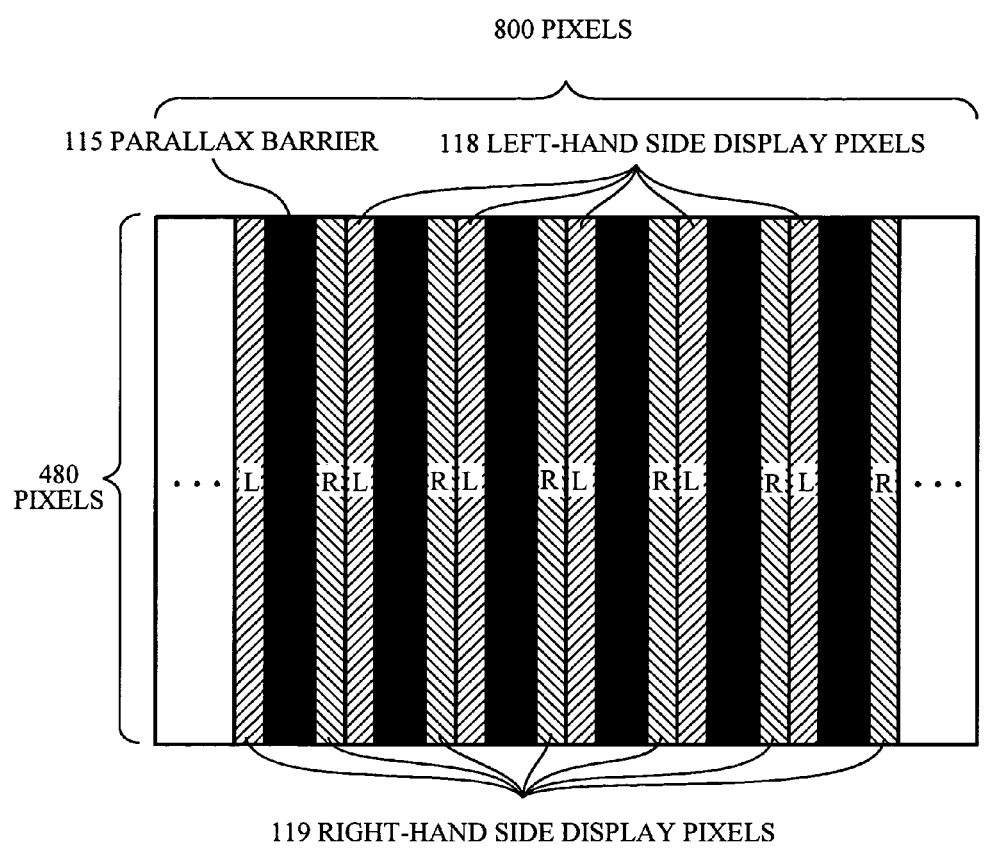
FIG. 8 is a front view of the liquid crystal panel in accordance with the first embodiment of the present invention.
Figure 9:
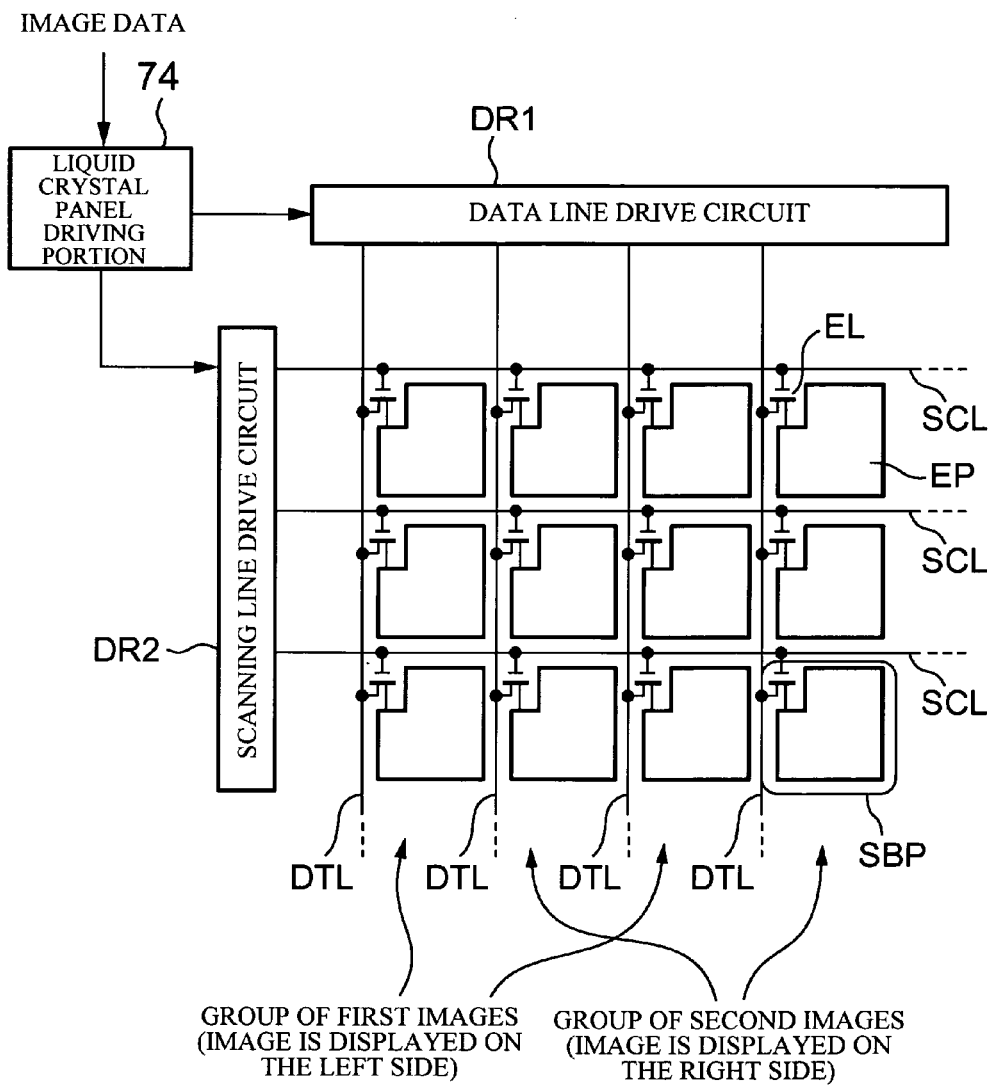
FIG. 9 is a circuit diagram of a TFT substrate in accordance with the first embodiment of the present invention.

FIG. 3 through FIG. 9 illustrate specific configurations of the display apparatus in accordance with the first exemplary embodiment of the present invention. FIG. 3 is a functional block diagram of the display apparatus. FIG. 4 is a functional block diagram showing a configuration of the controller. FIG. 5 is a functional block diagram of first and second image quality adjusting circuits. FIG. 6 is a functional block diagram of an image outputting portion. FIG. 7 is a view illustrating a cross-sectional configuration and effects of a liquid crystal panel. FIG. 8 is a front view of the liquid crystal panel. FIG. 9 is a circuit diagram of a TFT substrate.

Referring now to FIG. 3, the display apparatus includes the display 100, a controller 20, a distribution circuit 30, a first image quality adjusting circuit 50A, a second image quality adjusting circuit 50B, an image outputting portion 70, and the like. The display controller 10 includes the controller 20, the distribution circuit 30, the first image quality adjusting circuit 50A, the second image quality adjusting circuit 50B, the image outputting portion 70, and the like.

Referring now to FIG. 4, the controller 20 includes a processor (CPU) 21, an interface 22, a ROM 23, a RAM 24, and the like. The controller 20 controls the display apparatus according to a program stored in the ROM 23 in a comprehensive manner. Also, the controller 20 controls a visible range of the first image IM1 and a visible range of the second image IM1, which are separated from each other by superimposing the first image IM1 and the second image IM2 to be displayed on the display 100, by adjusting the image quality of at least one of the first image IM1 and the second image IM2 to have a given range.

The controller 20 is connected to a camera 310, a compact disc/mini disc (CD/MD) reproducing portion 320, a radio receiver 330, a TV receiver 340, a digital versatile disc (DVD) reproducing portion 350, a hard disc (HD) reproducing portion 360, a navigation portion 370, and the like, so as to send and receive data and control the afore-described components, which are mounted on a vehicle and respectively serve as supply sources supplying images and sounds, as illustrated in FIG. 3. The camera 310 captures images of surroundings and the like of the vehicle. The CD/MD reproducing portion 320 reproduces music or images. The radio receiver 330 receives radio waves via an antenna. The TV receiver 340 receives TV waves via an antenna through a selector 341. The DVD reproducing portion 350 reproduces music information and images in a DVD. The HD reproducing portion 360 reproduces images and music information stored in a HD. The navigation portion 370 outputs maps or route guide images on the basis of road information received by a VICS information receiver 371 and geographic information received by a GPS information receiver 372.

Additionally, the controller 20 is also connected to an external memory 140, the operating portion 150, a remote control send and receive portion 170, a brightness detecting sensor 190, a passenger detecting sensor 200, and the like, and enables various controls on the basis of various kinds of data obtained from the afore-mentioned components. The external memory 140 stores various kinds of data. The operating portion 150 is provided for operating the display apparatus. The remote control send and receive portion 170 sends and receives infrared signals or wireless signals between a remote controller 171 provided for controlling the display apparatus remotely. The brightness detecting sensor 190 is composed of a light switch or a light sensor to detect the brightness inside the vehicle. The passenger detecting sensor 200 is composed of a pressure-sensitive sensor or the like on the driver's seat or the front passenger's seat to detect a passenger in the vehicle.

The distribution circuit 30, as illustrated in FIG. 3, distributes sound data and image data supplied from the above-described camera 310, the CD/MD reproducing portion 320, the radio receiver 330, the TV receiver 340, the DVD reproducing portion 350, the HD reproducing portion 360, the navigation portion 370, and the like, to the first image quality adjusting circuit 50A or the second image quality adjusting circuit 50B, according to a control instruction issued by the controller 20.

A sound adjusting circuit 60 adjusts the sound data supplied from the distribution circuit 30 to output to a speaker 61, as illustrated in FIG. 3.

Each of the first image quality adjusting circuit 50A and the second image quality adjusting circuit 50B, by reference to FIG. 5, includes a contrast adjusting portion 51, a brightness adjusting portion 52, a color tone adjusting portion 53, a gamma value adjusting portion 54, and the like, and respectively adjusts the image qualities (contrast, brightness, color tone, and gamma value) of the image qualities of the first image data and the second image data, in response to the control instruction issued by the controller 20.

Referring now to FIG. 6, the image outputting portion 70 includes a first write circuit 71, a second write circuit 72, a video RAM (VRAM) 73, a liquid crystal panel driving portion 74, and the like. The first image data and the second image data, image qualities of which have respectively been adjusted by the first image quality adjusting circuit 50A and the second image quality adjusting circuit 50B, are respectively written into the first write circuit 71 and the second write circuit 72. The first write circuit 71 and the second write circuit 72 respectively write the first image data and the second image data, the image qualities of which are respectively adjusted by the first image quality adjusting circuit 50A and the second image quality adjusting circuit 50B, into given addresses of the VRAM 73, in order to superimpose such adjusted first image data and such adjusted second image data.

The VRAM 73 retains the image data on which the first image data and the second image data are superimposed. Such superimposed image data corresponds to respective pixels of the display 100. The liquid crystal panel driving portion 74 is a circuit that drives a liquid crystal panel 110, and also drives the corresponding pixels of the liquid crystal panel 110, on the basis of the superimposed image data retained in the VRAM 73. The liquid crystal panel 110 will be described later in detail.

The display 100 includes the liquid crystal panel 110, a backlight 120, a touch panel 130, and the like, as illustrated in FIG. 3. The backlight 120 sheds illuminated lights from the backside of the liquid crystal panel 110. The touch panel 130 is provided for inputting a signal to operate the display apparatus. Here, the touch panel 130 is not shown, yet is formed in a shape of transparent sheet and adhered to the front surface of the liquid crystal panel 110.

Referring now to FIG. 7, the liquid crystal panel 110 has a known structure. Sequentially from the backlight 120, there are provided a first deflecting plate 111, a thin film transistor (TFT) substrate 112, a liquid crystal layer 113, a color filter substrate 114 having pixels for three primary colors of RGB, a parallax barrier 115, a glass plate 116, a second deflecting plate 117, and the like.

The above-described liquid crystal panel 110 has a display screen in which, for example, 800 pixels are arranged in a horizontal direction and 480 pixels in a vertical direction, as illustrated in FIG. 7 and FIG. 8. Also, left-hand side display pixels 118 (hereinafter, also referred to as front passenger's display pixel 118) and right-hand side display pixels 119 (hereinafter, also referred to as driver's display pixel 119) are alternately arranged in a horizontal direction of the display screen.

The parallax barrier 115 is formed in a stripe-shaped manner, and includes shielding portions and transmitting portions, as illustrated in FIG. 7 and FIG. 8. The shielding portions are arranged between the left-hand side display pixels 118 and the right-hand side display pixels 119. By providing the parallax barrier 115 on the front surface of the color filter substrate 114, among the illuminated lights that have passed through the left-hand side display pixels 118, only the lights going towards the left side selectively pass through the transmitting portions of the parallax barrier 115. Among the illuminated lights that have passed through the right-hand side display pixels 119, only the lights going towards the right side selectively pass through the transmitting portions of the parallax barrier 115. This makes the first image IM1 visible from the right side (the driver's seat) of the liquid crystal panel 110, and also makes the second image IM2 visible from the left side (the front passenger's side). Here, a similar parallax barrier as disclosed in Japanese Patent Application Publication No. 10-123461 or Japanese Patent Application Publication No. 11-84131 may be employed for the parallax barrier 115.

The TFT substrate 112, by reference to FIG. 9, includes a data line drive circuit DR1, a scanning line drive circuit DR2, vertically arranged scanning lines SCL, horizontally arranged data lines DTL, TFT elements EL, pixel electrodes EP corresponding to the TFT elements EL, and the like, whereas each of the TFT elements EL is formed in each region where each of the scanning lines SCL and each of the data lines DTL are crossed. Sub pixels SBP are formed by regions surrounded by the scanning lines SCL and the data lines DTL, and the sub pixels SBP arranged along each of the data lines DTL are alternately assigned to the left-hand side display pixels 118 and the right-hand side display pixels 119. A drive timing of the data line drive circuit DR1 is controlled by the liquid crystal panel driving portion 74 to control a voltage applied to the pixel electrode EP. A drive timing of the scanning line drive circuit DR2 is controlled by the liquid crystal panel driving portion 74 to selectively scan the TFT element EL.

Figure 10:
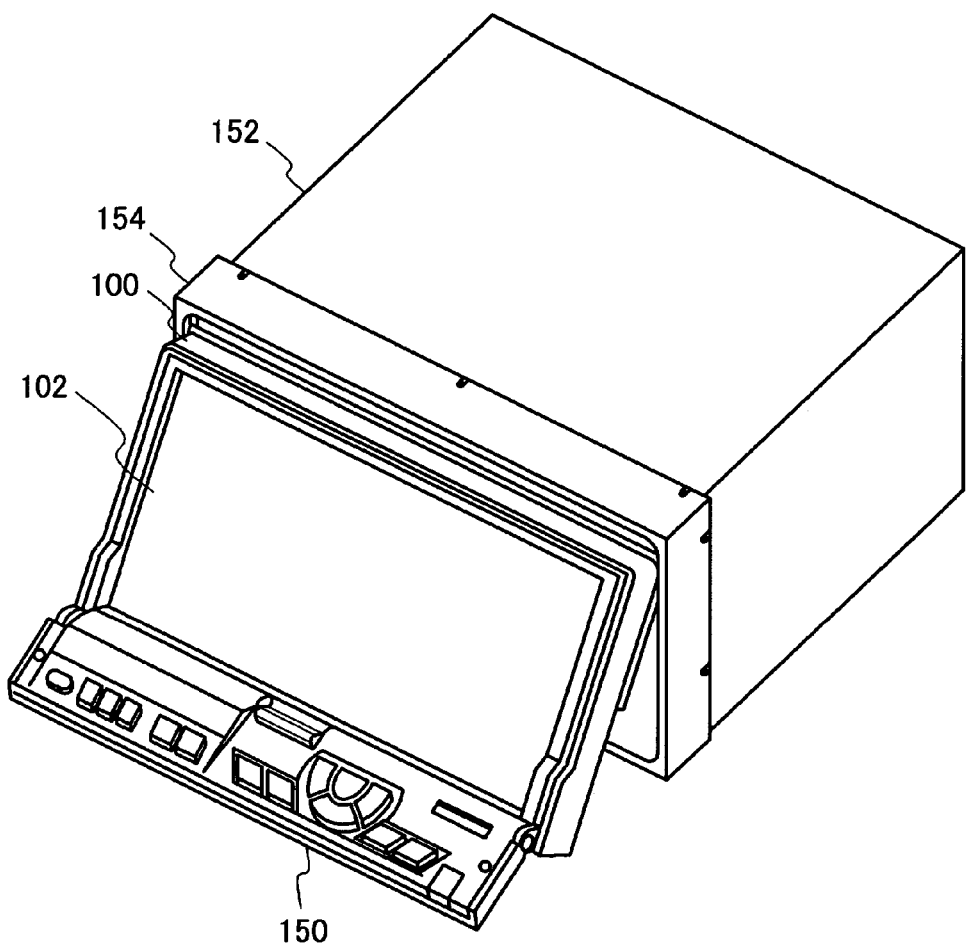
FIG. 10 is an external view of the display apparatus in accordance with the first embodiment of the present invention in a state where the display stands up with respect to a main body.
Figure 11:
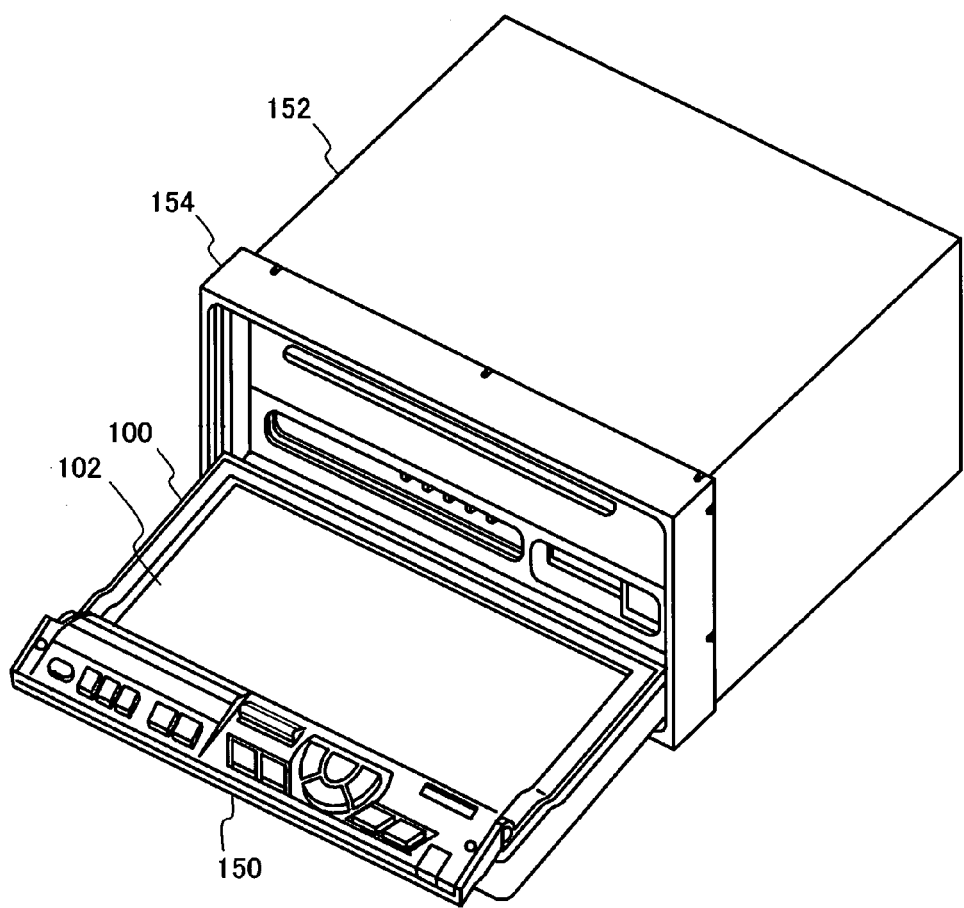
FIG. 11 is an external view of the display apparatus in accordance with the first exemplary embodiment of the present invention in a state where the display is moved from the main body and the front surface of the main body is operable.

FIG. 10 and FIG. 11 are external views of the display apparatus in accordance with the first exemplary embodiment of the present invention. The display apparatus is composed of: the display 100 having a display screen 102 and the operating portion 150; and a main body 152 composed of a different chassis from the display 100. As shown in FIG. 10, the back surface and the side surfaces of the display 100 are housed in a frame 154 provided at the periphery of the front surface of the main body 152, in a standing state with respect to the main body 152. The display 100 is used in the aforedescribed state. Here, the above-described standing state with respect to the main body 152 denotes that, as shown in FIG. 10, the back surface of the display 100 and the front surface of the main body 152 face each other and the display screen 102 of the display 100 stands up substantially perpendicularly.

Referring to FIG. 11, it is possible to move the display 100 from the front surface of the main body 152, by tilting the display 100. Then, it is possible to operate a memory medium, such as DVD or the like, provided in the front surface of the main body 152 or to operate another operating portion 150 of the main body 152. As shown in FIG. 3, the display 100 houses the touch panel 130, the liquid crystal panel 110, and the backlight 120. The main body 152 houses, for example, the controller 20 and other circuits. The frame 154 covers the side surfaces of the display 100 in a state where the display 100 stands up with respect to the main body 152, and is provided with a guide mechanism that prevents the main body 152 and the display 100 from separating when the display 100 is tilted. Here, the side surfaces of the display 100 denote four surfaces containing the bottom surface, the top surface, the left side surface, and the right side surface of the display 100.

Figure 12A:
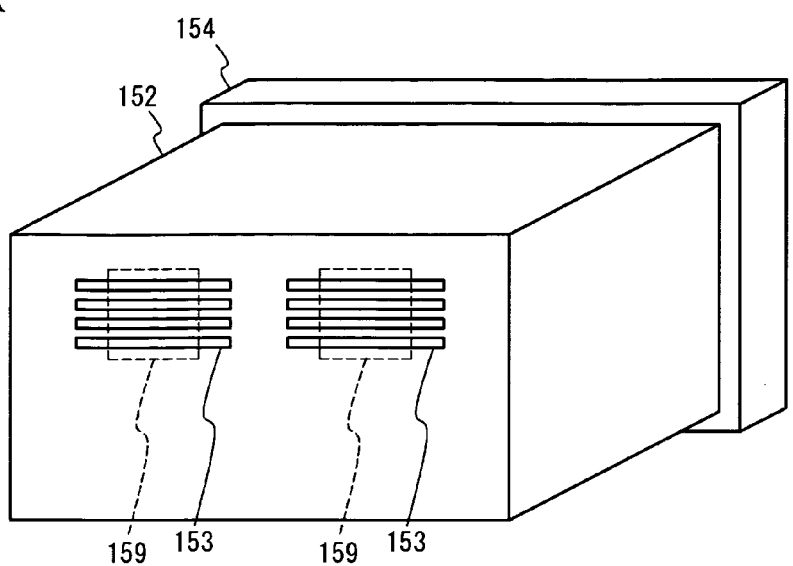
FIG. 12A illustrates the main body of the display apparatus, as viewed from the back surface, in accordance with the first exemplary embodiment of the present invention.

FIG. 12A illustrates the main body 152 of the display apparatus, as viewed from the back surface, in accordance with the first exemplary embodiment of the present invention.

Figure 12B:
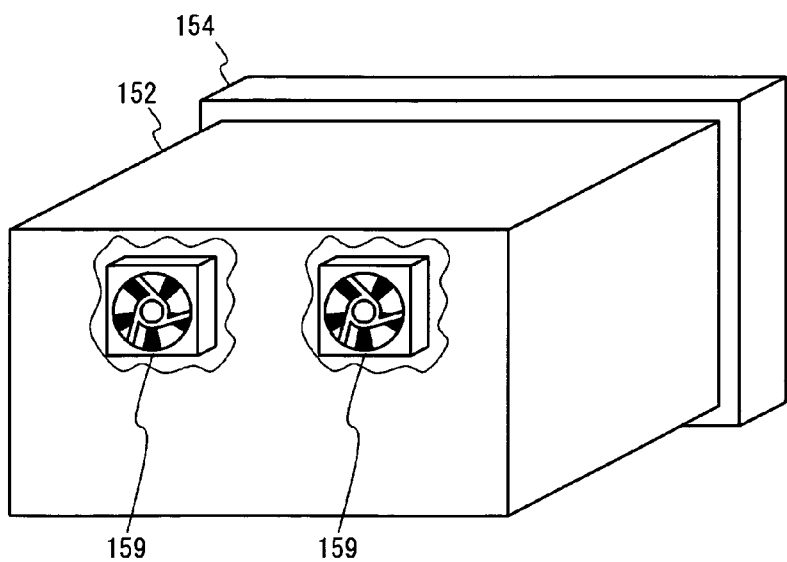
FIG. 12B illustrates main body fans, when the main body is viewed from the back surface.

The same components and configurations shown in FIG. 10 and FIG. 11 have the same reference numerals and a detailed explanation will be omitted. One or more air openings 153 are opened in the back surface of the main body 152. Dashed lines in FIG. 12A indicate main body fans 159 in the chassis. FIG. 12B illustrates the main body fans 159 by partially removing the back surface of the chassis around the main body fans 159 of the main body 152 shown in FIG. 12A. Other members in the main body 152 are not shown. The main body fan 159 is an axial fan, and the one or more air openings 153 are arranged in air current direction of the main body fan 159 and provided in the back surface of the main body 152. This permits the air inside the main body 152 to be exhausted to the outside. Accordingly, external air is flown into the inside of the main body 152 from a gap or clearance of the chassis of the main body 152. In this manner, the air flown into the inside of the main body 152 reduces heat developed by the inside of the main body 152, thereby allowing the inside of the main body 152 to be cooled down.

Figure 13A:
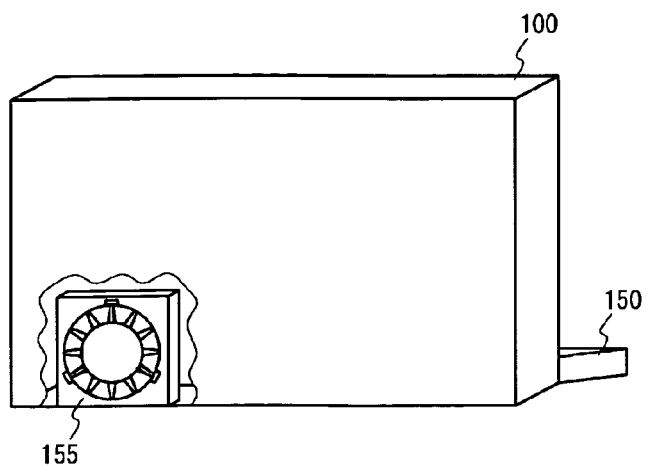
FIG. 13A illustrates a display fan, when the display is viewed from the back surface.
Figure 13B:
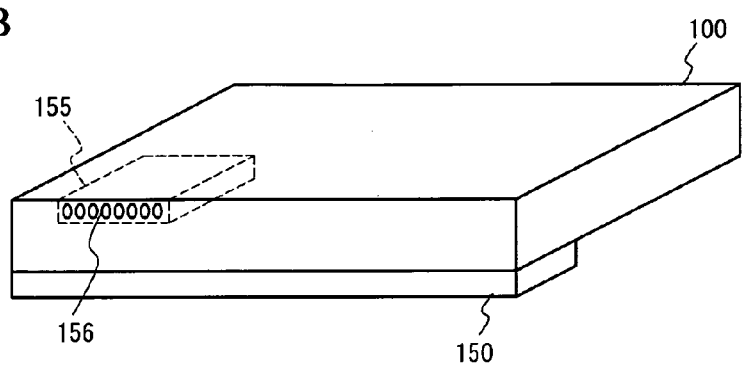
FIG. 13B illustrates the display, as viewed from the bottom surface.

FIG. 13A illustrates the display 100 of the display apparatus, as viewed from the back surface, in accordance with the first exemplary embodiment of the present invention. The same components and configurations shown in FIG. 10 and FIG. 11 have the same reference numerals and a detailed explanation will be omitted. Here, FIG. 13A illustrates a display fan 155 by partially removing the back surface of the chassis of the display 100 around the display fan 155. Other members in the display 100 are not shown. The display fan 155 is provided inside of the back surface of the chassis of the display 100. FIG. 13B illustrates the display 100, as viewed from the bottom surface. Dashed lines in FIG. 13B indicate the place where the display fan 155 is provided. One or more air openings 156 are provided in the bottom surface of the chassis of the display 100, namely, below the display fan 155. There are no air openings in the back surface of the display 100. The display fan 155 is a centrifugal fan, and the air inside the display 100 is exhausted to the outside from the one or more air openings 156 as the display fan 155 operates. Accordingly, external air is flown into the inside of the display 100 from a gap or clearance of chassis of the main body 152. In this manner, the air flown into the inside of the display 100 reduces heat developed by the inside of the display 100, thereby allowing the inside of the display 100 to be cooled down.

Figure 13C:
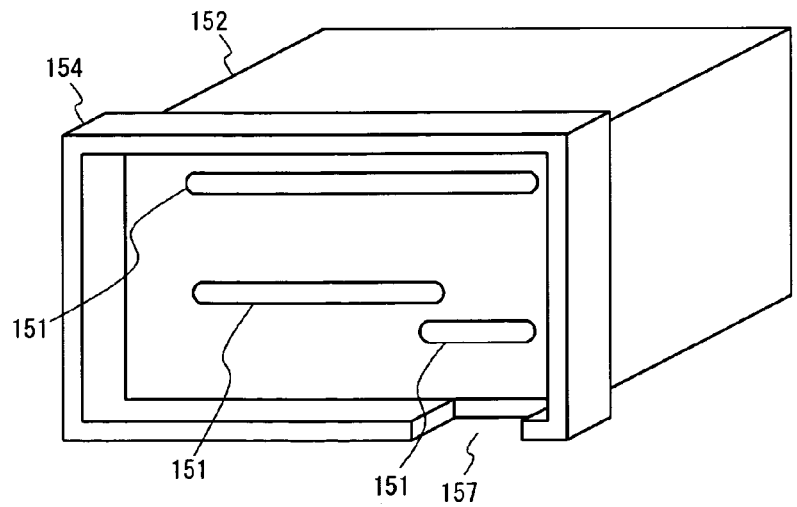
FIG. 13C illustrates the main body, as viewed from the front surface.

FIG. 13C illustrates the main body 152, as viewed from the front surface. The same components and configurations shown in FIG. 10 and FIG. 11 have the same reference numerals and a detailed explanation will be omitted. A load/unload opening 151 and an operating portion 151 are provided in the front surface of the main body 152 to insert and remove the memory media, such as DVD, MD, or the like, into and from the inside of the main body 152 or to instruct to insert and remove the memory media. A recess portion 157 is provided for ventilation as an air passage in a portion of the bottom of the frame 154 to correspond to the one or more air openings 156, in a state where the display 100 stands up with respect to the main body 152. The recess portion 157 may have, for example, a structure in which openings are provided in the frame 154, instead of a recess portion or a receding portion provided in the frame 154 as shown in FIG. 13C. Also, if the width of the frame 154 is, for example, small or there is a big gap or clearance between the frame 154 and the display 100, the space 157 is not always necessary.

The display apparatus employed in the first exemplary embodiment includes: the display fan 155 to cool down the inside of the display 100; and the main body fan 159 to cool down the inside of the main body 152. It is therefore possible to cool down the inside of the display 100 effectively, even if a considerable amount of heat is developed in the display 100.

In addition, the one or more air openings 156 for the display fan 155 are provided at the bottom surface of the display 100. Therefore, the one or more air openings 156 provided in any one of the side surfaces (the top surface, the bottom surface, the left side surface, and the right side surface) of the display 100 are capable of exhausting the air inside the display 100, even if the display 100 stands up with respect to the front surface of the main body 152 and covers the front surface of the main body 152. It is therefore possible to effectively cool down the inside of the display 100.

Furthermore, the main body 152 has the frame 154 that covers the side surfaces of the display 100 in a state where the display 100 stands up with respect to the front surface of the main body 152. The recess portion is provided in a portion of the frame 154 to correspond to the one or more air openings 156, in a state where the display 100 stands up with respect to the main body 152. It is therefore possible to exhaust the air inside the display 100, when the display apparatus is used in a state where the display 100 stands up with respect to the main body 152, even if the side surfaces of the display 100 are covered by the frame 154. Accordingly, it is possible to cool down the inside of the display 100 more effectively.

Figure 14A:
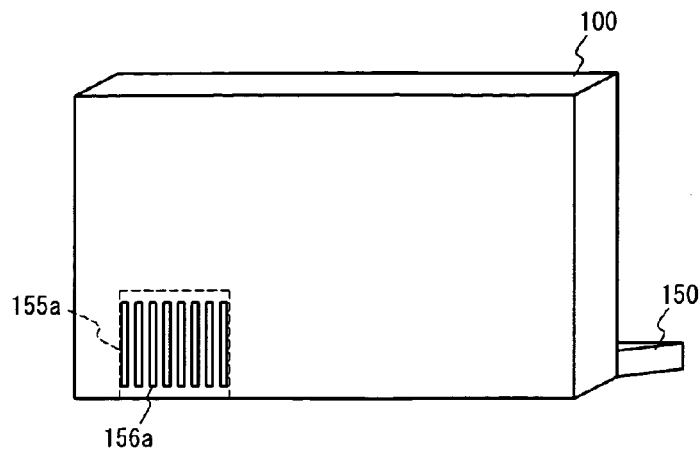
FIG. 14A illustrates the display of the display apparatus, as viewed from the back surface, in accordance with a variation example 1.
Figure 14B:
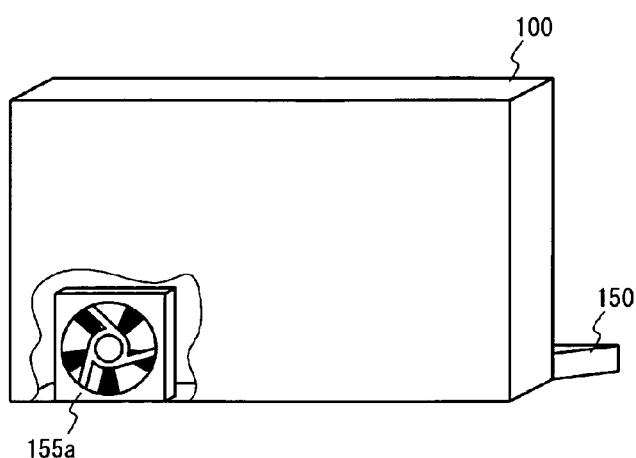
FIG. 14B illustrates the display fan when the display is viewed from the back surface.
Figure 14C:
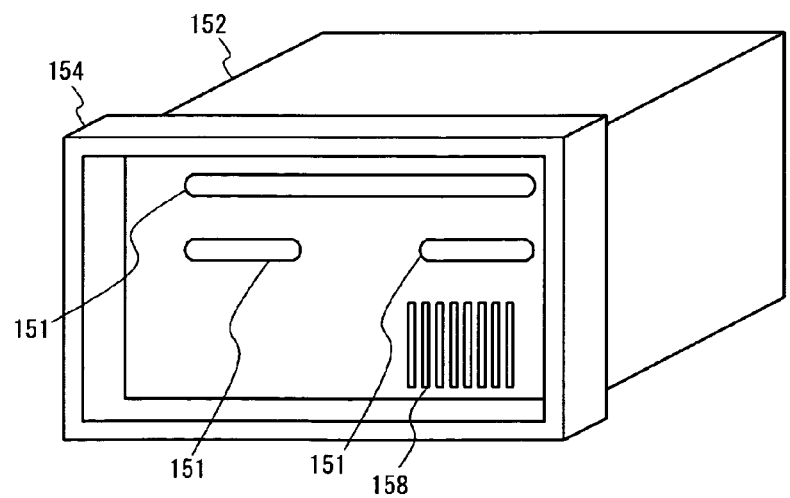
FIG. 14C illustrates the main body, as viewed from the front surface.

Next, a description will be given of a variation example 1 of the first exemplary embodiment of the present invention. FIG. 14A illustrates the display 100 of the display apparatus, as viewed from the back surface, in accordance with the variation example 1. There are provided one or more air openings 156a in the back surface of the chassis of the display 100. A dashed line indicates the place of a display fan 155a. FIG. 14B illustrates the display fan 155a by partially removing the back surface of the chassis of the display 100 around the display fan 155a shown in FIG. 14A. Other members are not shown. The display fan 155a is an axial fan, and the one or more air openings 156a are arranged in the air current direction of the display fan 155a and provided in the back surface of the display 100. FIG. 14C illustrates the main body 152, as viewed from the front surface. The same components and configurations shown in FIG. 10 and FIG. 11 have the same reference numerals and a detailed explanation will be omitted. One or more auxiliary air openings 158 are provided in the front surface of the chassis of the main body 152 to correspond to the one or more air openings 156a, in a state where the display 100 stands up with respect to the main body 152.

With the above-described configuration, when the display 100 is used in a standing state with respect to the main body 152 and even if the back surface of the display 100 is covered with the front surface of the main body 152, the display fan 155a is capable of exhausting the air inside the display 100 through the one or more air openings 156a and the one or more auxiliary air openings 158 to the inside of the main body 152. Then, the air inside the main body 152 is exhausted through the one or more air openings 153 to the outside by the main body fan 159. Accordingly, the inside of the display 100 can be cooled down effectively.

Figure 15A:
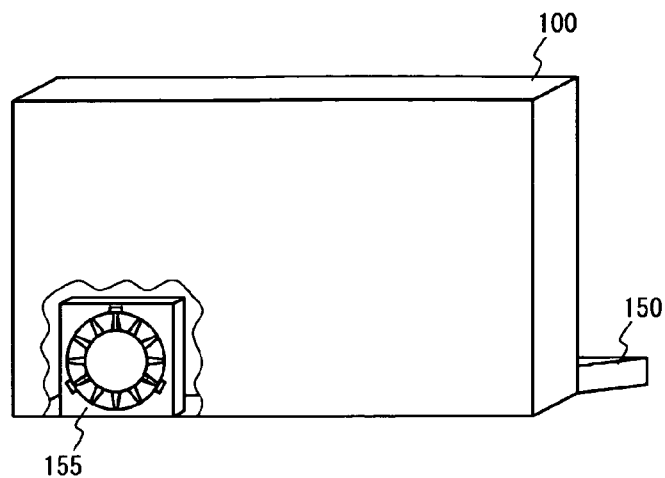
FIG. 15A illustrates the display of the display apparatus, as viewed from the back surface, in accordance with a variation example 2.
Figure 15B:
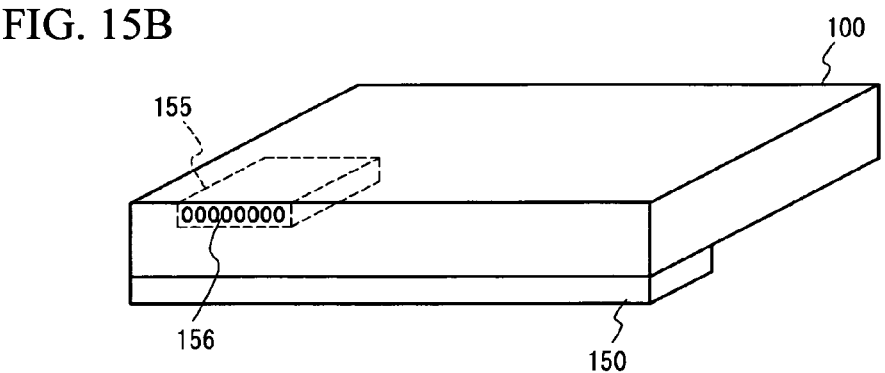
FIG. 15B illustrates the display, as viewed from the bottom surface.
Figure 15C:
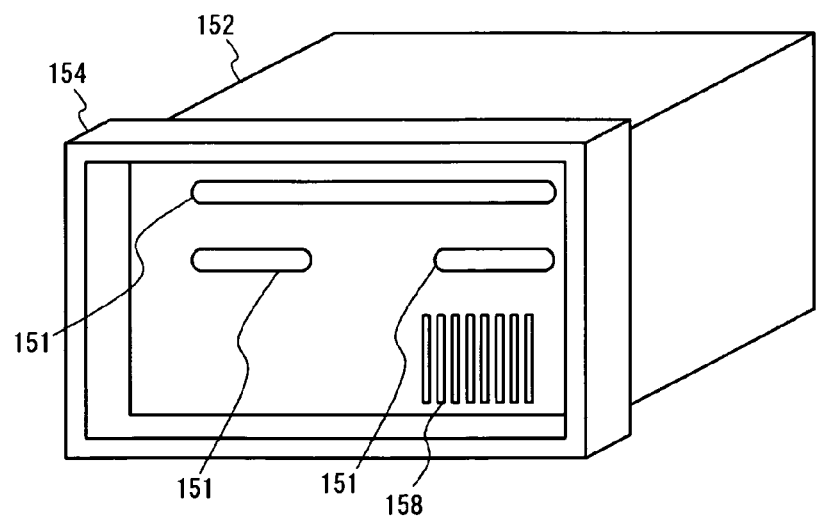
FIG. 15C illustrates the main body, as viewed from the front surface.

Next, a description will now be given of a variation example 2. In the variation example 2, the display 100 has the same configuration as that employed in the first exemplary embodiment, and the main body 152 has the same configuration as that employed in the variation example 1. That is to say, FIG. 15A, illustrating the display 100 of the display apparatus, as viewed from the back surface, in accordance with the variation example 2, is same as FIG. 13A. FIG. 15B, illustrating the display 100, as viewed from the bottom surface, is same as FIG. 13B. Meanwhile, FIG. 15C, illustrating the main body 152, as viewed from the front surface, is same as FIG. 14C. The same components and configurations have the same reference numerals and a detailed explanation will be omitted. In the variation example 2, the one or more air openings 156 of the display fan 155 are provided in the bottom surface of the display 100, in a similar manner as the first exemplary embodiment. Also, the one or more auxiliary air openings 158 are provided in the front surface of the main body 152, in a similar manner as the variation example 1.

With such configuration, when the display 100 is used in a standing state with respect to the main body 152, the air exhausted from the one or more air openings 156 in any one of the side surfaces of the display 100 passes through the gap or clearance between the back surface of the display 100 and the front surface of the main body 152, and is exhausted from the front surface of the display 100. In addition, the air exhausted from the one or more air openings 156 can pass through the gap or clearance between the back surface of the display 100 and the front surface of the main body 152, and can be exhausted to the inside of the main body 152 from the one or more auxiliary air openings 158. Then, the air inside the main body 152 is exhausted through the one or more air openings 153 to the outside by the main body fan 159. It is therefore possible to cool down the inside of the display 100 effectively. The one or more air openings 156 of the display fan 155 may be provided at an arbitrary position in the side surface or the back surface of the display 100. In the variation example 2, the cooling efficiency of the inside of the display 100 is lower than those of the first exemplary embodiment and the variation example 1. However, the display fan 155 or 155a may be arranged at an arbitrary position in the side surface and in the back surface, thereby enhancing design flexibility. In addition, unlike the variation example 1, there is no necessity of providing the gap or clearance in the frame 154.

Figure 16A:
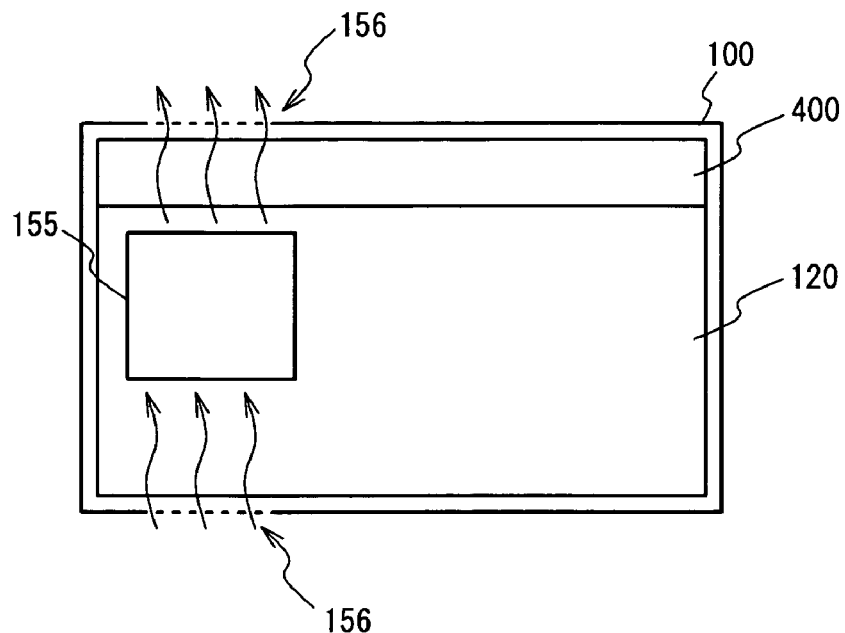
FIG. 16A is a perspective view of the display, as viewed from the back surface, in accordance with a variation example 3.
Figure 16B:
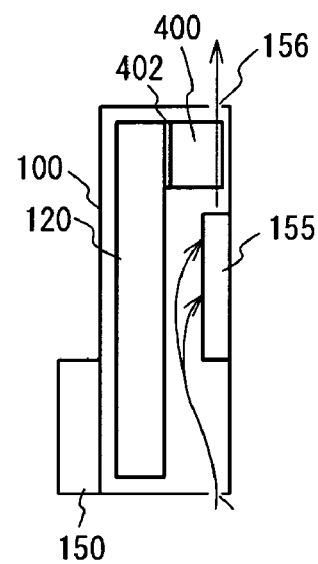
FIG. 16B is a perspective view of the display, as viewed from the side surface, in accordance with the variation example 3.

Next, a description will now be given of a variation example 3 of the first exemplary embodiment. FIG. 16A is a perspective view of the display 100 employed in the variation example 3, as viewed from the back surface. FIG. 16B is a perspective view of the display 100, as viewed from the side surface. FIG. 16A and FIG. 16B show the chassis of the display 100, the backlight 120, a heat sink 400, and the display fan 155. Other members are not shown. The same components and configurations employed in the first exemplary embodiment have the same reference numerals and a detailed explanation will be omitted. Referring to FIG. 16A and FIG. 16B, the backlight 120 is arranged in the front of the display 100. The metal heat sink 400 is provided in the upper back surface of the backlight 120 via a thermal conduction sheet 402. The display fan 155 is provided near the back surface of the display 100. The one or more air openings 156 are provided in any one of the side surfaces of the chassis of the display 100.

The display fan 155 is a centrifugal fan, and the air is flown from the one or more air openings 156 in the bottom surface of the display 100, as the display fan 155 operates. The air exhausted by the display fan 155 cools down the heat sink 400, and is exhausted from the one or more air openings 156 in the top surface of the display 100. Such air current is indicated by arrows in FIG. 16A and FIG. 16B. The heat sink 400 is thermally coupled to the backlight 120 via the thermal conduction sheet 402. As described above, there is provided the heat sink 400 thermally coupled to the backlight 120, which is a portion of the display 100. The backlight 120 generates heat most considerably in the display 100. The display fan 155 cools down the heat sink 400 to cool down the backlight 120. This allows release of the heat generated in the backlight 120 efficiently, thereby cooling down the inside of the display 100 efficiently.

Figure 17:
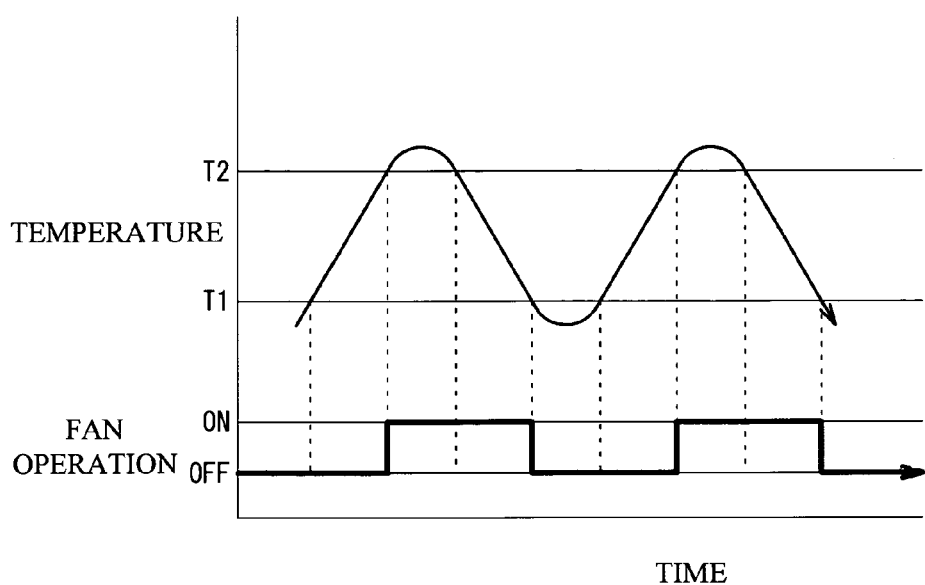
FIG. 17 is a view showing an example of control of the display fan employed in the first exemplary embodiment and the variation examples thereof.

FIG. 17 is a view showing an example of control of the display fan 155 or 155a employed in the first exemplary embodiment and the variation examples thereof. The horizontal axis represents time, the vertical axis represent temperature inside the display 100 and the operation of the display fan 155 or 155a. When the temperature inside the display 100 rises and exceeds T2, the display fan 155 or 155a operates. When the temperature inside the display 100 is reduced to be lower than T1, the display fan 155 or 155a stops operating. When the temperature inside the display 100 rises and exceeds T2 again, the display fan 155 or 155a operates again. In this manner, when the temperature inside the display 100 is equal to or higher than T2, the display fan 155 or 155a operates so that the temperature inside the display 100 becomes equal to or lower than T1. This makes it possible to efficiently cool down the temperature inside the display 100. Also, when the temperature inside the display 100 is equal to or lower than T1, the display fan 155 or 155a stops the operation until the temperature inside of the display 100 becomes equal to or higher than T2. It is therefore possible to reduce the power consumption for the operation of the display fan 155 or 155a.

The display apparatus employed in the first exemplary embodiment and the variations thereof is a multi-view display on which different images (the first image and the second image) are visible from different viewing directions. In such display apparatus, a considerable amount of heat is developed in the display 100, as described, increasing the temperature inside the display 100. Therefore, with the above-described configuration, the inside of the display 100 can be cooled down efficiently.

The description has been given of an example of the multi-view display apparatus mounted in a vehicle in the first exemplary embodiment and the variation examples. The present invention is not limited to the multi-view display apparatus mounted in a vehicle, and is applicable to any display apparatus other than the in-vehicle display apparatus. In addition, the display fan and the main body fan are provided for exhausting the internal air, but may be provided for intaking external air. Furthermore, a description has been given of a case where the display 100 is tilted downwardly to operate the front surface of the main body 152. However, another method may be employed.

The description heretofore has been given of a case where the driver sits on a right-hand side in an automobile and the front-seat passenger sits on a left-hand side, however, the present invention is not limited thereto. The driver may sit on a left-hand side and the front-seat passenger may sit on a right-hand side in an automobile.

The present invention is not limited to the above-mentioned exemplary embodiment, and other embodiments, variations and modifications may be made without departing from the scope of the present invention.

The present invention is based on Japanese Patent Application No. 2005-274791 filed on Sep. 21, 2005, the entire disclosure of which is hereby incorporated by reference.

What is claimed is:

1. A display apparatus, comprising:
   a main body;
   a display enclosure including a front surface and a display screen at the front surface, the display screen being capable of simultaneously displaying a first image as viewed from a first viewing angle and a second image different from the first image as viewed from a second viewing angle different from the first viewing angle, the first and second images being simultaneously displayed over a common display area of the display screen, the display enclosure being exterior to the main body;
a display fan disposed within the display enclosure to cool an interior of the display enclosure; and
a main body fan disposed within the main body to cool an interior of the main body.

2. The display apparatus as claimed in claim 1, the display enclosure including side surfaces, and an air opening defined in one of the side surfaces for the display fan.

3. The display apparatus as claimed in claim 2,
further comprising a frame that covers the side surfaces of the display enclosure such that a back surface of the display enclosure and a front surface of the main body face each other, the display enclosure being mounted to the frame to enable the display enclosure to be tilted relative to the main body;
wherein the frame defines a recess portion for ventilation to correspond to the air opening in a state where the back surface of the display enclosure faces the front surface of the main body.

4. The display apparatus as claimed in claim 1, the display enclosure including a back surface, and an air opening defined in the back surface for the display fan,
the main body including a front surface, and an auxiliary air opening defined in the front surface of the main body.

5. The display apparatus as claimed in claim 4,
the display enclosure being mounted to enable the display enclosure to be tilted relative to the main body; and
the auxiliary air opening being arranged to oppose the display fan in a state where a back surface of the display enclosure and a front surface of the main body face each other.

6. The display apparatus as claimed in claim 1, the display enclosure including a backlight and a heat sink thermally coupled to the backlight, the display fan being disposed so as to cool the heat sink.

7. A display apparatus for use in a vehicle, comprising:
a display enclosure including front and rear surfaces, and a display screen at the front surface, the display screen being capable of simultaneously displaying a first image as viewed from a first viewing angle and a second image different from the first image as viewed from a second viewing angle different from the first viewing angle, the first and second images being simultaneously displayed over a common display area of the display screen;
a main body defining a front surface facing the rear surface of the display enclosure;
a frame, the rear surface of the display enclosure and the front surface of the main body being mounted within the frame;
a display fan disposed within the display enclosure to cool an interior of the display enclosure; and
a main body fan disposed within the main body to cool an interior of the main body.

8. The display apparatus according to claim 7, the display enclosure being spaced from the main body, such that the display fan is exterior to the main body.

9. The display apparatus according to claim 7, the display enclosure being mounted to the frame so that the display enclosure can be tilted relative to the main body between an orientation where the rear surface of the display enclosure faces the front surface of the main body and an orientation where the rear surface of the display enclosure is substantially perpendicular to the front surface of the main body.

* * * * *